FREQUENCY SELECTIVE DEVICE

Filed April 11, 1950

3 Sheets-Sheet 1

INVENTORS
PHIL CUTLER
KARL F. ROSS
BY
Karl F. Ross
AGENT

INVENTORS
PHIL CUTLER
KARL F. ROSS
BY Karl F. Ross
AGENT

FREQUENCY SELECTIVE DEVICE

Filed April 11, 1950

INVENTORS
PHIL CUTLER
KARL F. ROSS
BY
Karl F. Ross
AGENT

United States Patent Office 2,728,911
Patented Dec. 27, 1955

2,728,911

FREQUENCY SELECTIVE DEVICE

Phil Cutler, Brooklyn, and Karl F. Ross, Bronx, N. Y.

Application April 11, 1950, Serial No. 155,207
12 Claims. (Cl. 343—206)

Our invention relates to frequency selective devices for receivers of electromagnetic waves.

More particularly, our invention relates to communication systems in which a signaling wave, arriving over an existing communication channel, may be destined for a particular one in a group of several receivers or loads all connected to the same channel, it being therefore necessary for the receivers selectively to accept or reject this wave in accordance with predetermined characteristics of the wave. In the usual case, the destination of the message will be indicated by the frequency of the wave within the range of frequencies transmittable over the communication channel, and it will be evident that the number of receivers thus accommodatable by a channel of given width will be increased as the selectivity of the discriminating apparatus at each receiver is enhanced. A system of the above description may, for example, be found in radio links enabling selective communication with a plurality of mobile stations, or in remote control arrangements.

It is an object of the present invention to provide, in a system of the character set forth, a frequency selective device adapted to distinguish sharply between waves narrowly separated in frequency.

Another object of our invention is to provide, in combination with a device of this character, means for readily varying the frequency or band of frequencies accepted (or rejected) by the device.

A further object of this invention is to provide a frequency selective device adapted to direct an incoming wave to a selected one of several loads, depending upon the frequency of the wave.

Still another object of our invention is to provide a device as defined above including means for positively making the frequency selectivity thereof independent of the amplitude of the incoming wave.

Yet a further object of the instant invention is to provide means for adapting a device of the character set forth to systems in which waves of different frequencies are received simultaneously rather than in succession.

The above and other objects will become apparent from the following description of certain embodiments of the invention, reference being had to the accompanying drawing in which:

Fig. 1 is a circuit diagram illustrating a first embodiment of the invention;

Figs. 2 through 7 show various forms of output electrodes usable in the system of Fig. 1, Fig. 5 being a section on the line 5—5 of Fig. 4 and Fig. 7 being a section on the line 7—7 of Fig. 6.

Figure 1:
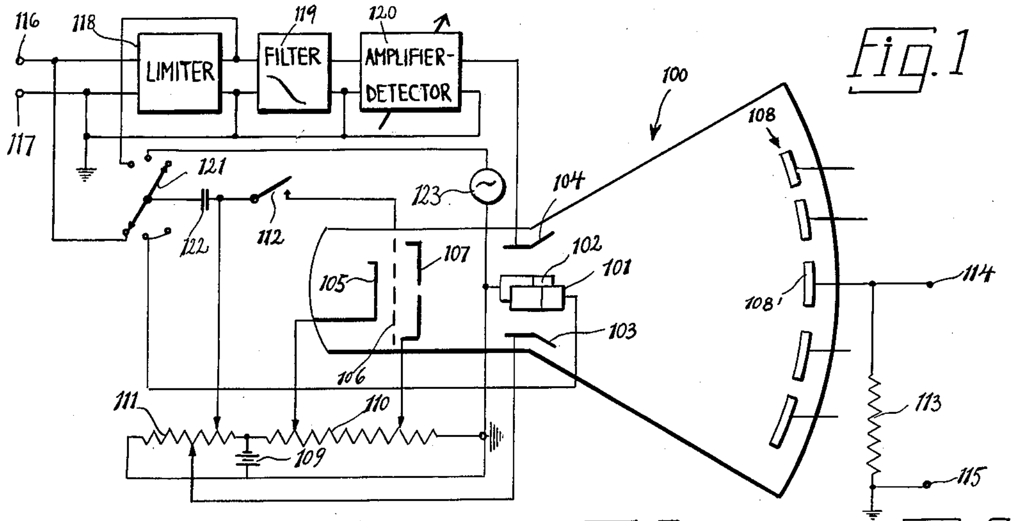

Referring to Fig. 1, there is shown a cathode ray tube 100 having horizontal deflecting electrodes 101, 102, vertical deflecting electrodes 103, 104, an electron gun shown here schematically as a cathode 105, an intensity control electrode 106, an accelerating anode 107, and a set of output electrodes generally indicated at 108. A source of potential, shown here as a battery 109 having its positive terminal grounded, is bridged across a potentiometer 110 to respective taps of which the cathode 105 and the anode 107 are connected. Another potentiometer 111 serves as a source of biasing potential for the lower vertical deflecting electrode 103 and also, via another tap, for the intensity control electrode 106 connected thereto by way of a switch 112.

Each output electrode 108 is connected to an output resistor 113, grounded at one end, across which there are provided two output terminals 114, 115. Only one output resistor and corresponding terminals have been shown, associated with the center electrode 108', yet it will be understood that each output electrode is similarly equipped.

Signal waves received at the intput terminals 116, 117 pass, successively, through a limiter 118, a sloping filter 119 and an amplifier-detector 120, the output of the latter being directly applied to the vertical deflecting electrodes 103, 104. A manually operable selector switch 121 connects in a first position the ungrounded input terminal 116 to the switch 112, via a condenser 122, and in the closed position of switch 112 to the intensity control electrode or grid 106. In a second position switch 121 connects a local oscillator 123 across the horizontal deflecting electrodes 101, 102, while in a third position of this switch the output of limiter 118 is applied to these electrodes.

Let us first assume that the selector switch is in its first position, as shown, and that with switch 112 closed an amplitude modulated carrier wave is applied to the input terminals 116, 117. Since the horizontal deflecting electrodes are open-circuited, the horizontal dimension of the target electrodes 108 is immaterial in this case. As long as the frequency of the carrier wave remains constant, a fixed potential will be applied to the vertical deflecting electrode 104, inasmuch as the limiter 119 cuts off the amplitude modulation of this wave. Under these conditions, with proper setting of potentiometer 111, the beam of cathode ray tube 100 will be constrained to impinge upon a selected one of the target electrodes 108, say, the electrode 108'. The beam, however, is intensity modulated by the incoming wave, which is applied to the grid 106 by way of switch 121, condenser 122 and switch 112, hence the current flowing through load resistor 113 will vary in step with this wave. The modulated carrier will, therefore, be selectively received at terminals 114, 115, to the exclusion of similar terminals connected to the other target electrodes 108.

Should the frequency of the carrier wave be changed in some predetermined way, the beam will be deflected away from target electrode 108' upon some other target electrode, thus directing the output of the circuit to a different channel. If the switch 112 is left open, a steady current will flow through the respective load resistor which may be utilized to energize a suitable indicator, alarm device, relay or the like.

Figs. 2 through 7 show several forms which the target electrodes 108 may take in order to enable the arrangement of Fig. 1 to be utilized as a frequency demodulator. Let us assume that each of these electrodes has the form of the triangular electrode 108*a*, shown in Fig. 2, and that switch 121 is in its second (vertical) position. From the foregoing it will be apparent that a frequency modulated carrier, ranging within a predetermined frequency band, will cause the beam of tube 100 to impinge upon a selected target electrode, e. g. 108', but that the locus of impingement will vary vertically in accordance with the instantaneous frequency of the carrier. At the same time the beam will be deflected horizontally in step with the output of local oscillator 123, and this will produce at the terminals 114, 115 a pulsating output of a pulse width varying with the frequency of the input wave. Thus it will be seen that the width of the pulses will tend toward zero when the beam sweeps past the tip of the triangle 108*a* (Fig. 2), i. e. when the output of detector 120 produces a more downward deflection, and that maximum pulse width will result from a more upward deflection of the beam. The high-frequency component of the pulse width modulated output may, of course, be removed by any conventional means and the pulses integrated to produce the modulating signal.

Figures 2, 3, 4, 5, 6, 7:
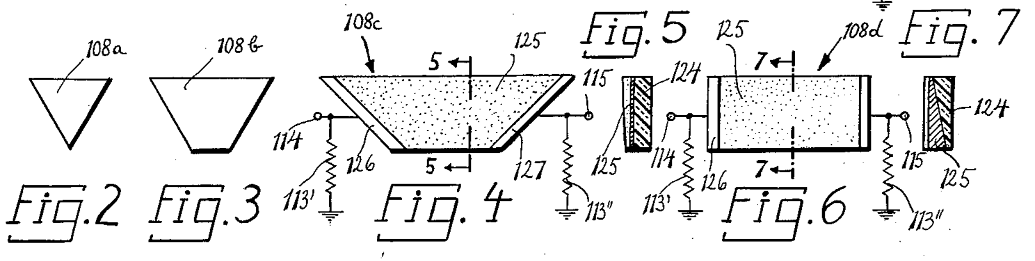

It will be understood that similar results may be obtained by replacing the triangular electrode 108*a* of Fig. 2 with a trapezoidal electrode such as 108*b* (Fig. 3).

A different type of electrode is shown in Figs. 4 and 5. This electrode, generally designated 108*c*, comprises a dielectric backing 124, a trapezoidal layer 125 of resistance material thereon, and a pair of highly conductive collector strips 126, 127 adjacent and in contact with the inclined sides of the layer 125. Output terminals 114, 115 are connected to the strips 126, 127 and are grounded by way of load resistors 113', 113'', respectively.

Whereas in the case of electrode 108*a* or 108*b* it will be desirable to make the extent of the horizontal sweep of the beam at least equal to the length of the base or longer (upper) side of the triangle or trapezoid, we shall now assume that the electrode 108*c* is swept by a beam whose horizontal deviation does not pass beyond the ends of the shorter (lower) parallel side of the trapezoidal layer 125. It will be apparent that the terminals 114, 115 will be at the same potential when the beam falls upon the center line of the electrode, so that no output will be obtained, and that a maximum potential difference will exist when the beam impinges upon the resistive layer 125 close to one or the other collector strip 126, 127. From the geometry of the arrangement, however, it follows that impingement of the beam at a given distance from the center line will cause greater unbalance of the terminal voltages when the locus of impingement is closer to the shorter (lower) edge, thus also closer to the collector strip 126 or 127, than when this locus is nearer to the longer (upper) edge of the layer 125. As a result, the output taken off at terminals 114, 115 will be amplitude modulated in dependence upon the frequency of the carrier wave applied to terminals 116, 117, and demodulation may proceed as in the previous example.

Figs. 6 and 7 show an electrode 108*d* which is similar to electrode 108*c*, except that the resistive layer 125 is now of rectangular, rather than trapezoidal, configuration but of wedge-shaped cross section; the dielectric backing 124 is shown to have a cross section which is complementary to that of layer 125, thus maintaining the overall thickness of the electrode constant. On the assumption that the horizontal sweep extends over a fraction only of the length of the rectangular layer 125, amplitude modulation will again result by virtue of the different specific resistance obtaining at different levels of the electrode 108*d*. It should be noted that the geometrical configurations shown in Figs. 2–7 may be deviated from in order to produce any desired degree of linearity between the resulting amplitude modulation and the modulating signal received, taking into account also the transmission characteristic of the sloping filter 119.

By placing selector switch 121 in its third position, the output of the local oscillator 123 may be replaced by that of the limiter 118, if a carrier component of variable frequency at the terminals 114, 115 is not objectionable. Switch 112 is preferably open in both the second and the third position of the selector switch 121, at least if a target electrode of the type shown in Fig. 4 or 6 is used, thereby avoiding distortion of the strictly frequency dependent output signal.

Figures 8, 9, 10, 11:
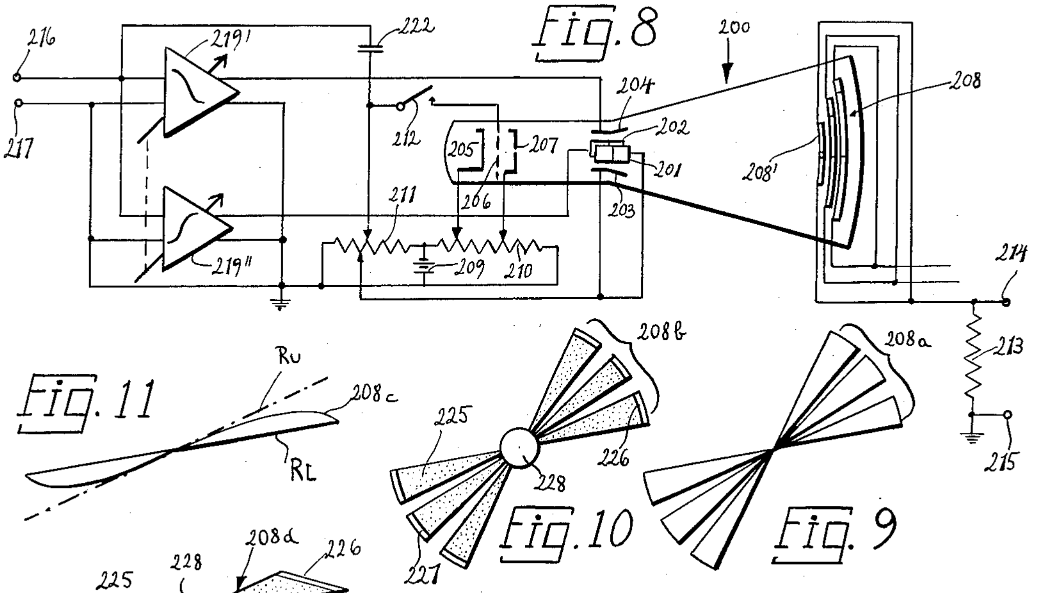
Fig. 8 is a circuit diagram illustrating a second embodiment of the invention.
Figs. 9 through 12 show various forms of output electrodes usable in the system of Fig. 8.

The circuit of Fig. 8 comprises a cathode ray tube 200, having horizontal and vertical deflection electrodes 201—204, a cathode 205, a grid 206, an accelerating anode 207 and a plurality of target electrodes generally indicated at 208. One of these target electrodes, designated 208', is connected to output terminal 214 which in turn is connected to grounded output terminal 215 by way of a load resistor 213. Input terminals 216, 217 are connected in parallel to a pair of sloping amplifiers 219', 219'' having oppositely sloping amplitude-versus-frequency characteristics. Input terminal 216 is also connected via a condenser 222 and a switch 212 to grid 207 which is biased from a battery 209 by means of a potentiometer 211, as is vertical deflection electrode 203 and horizontal deflection electrode 201; another potentiometer 210 serves as a source of biasing potential for cathode 205 and for anode 207.

Figure 21:
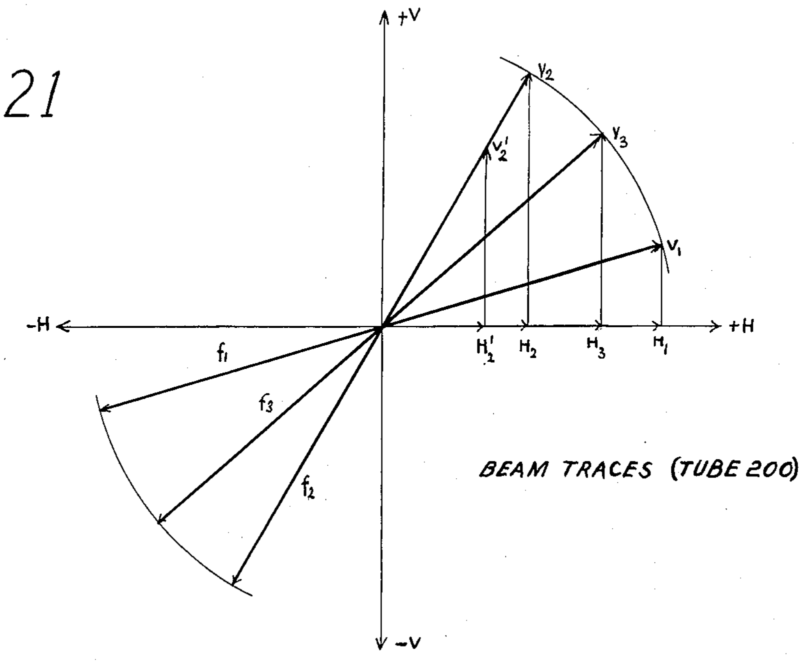
Fig. 21 is a graph to explain the operation of the system of Fig. 8.

The target electrodes 208 may have a variety of forms, some of which are shown in Figs. 9 through 12. Before going into a description thereof, reference is had to Fig. 21 for a brief analysis of the mode of functioning of a circuit as shown in Fig. 8. If a wave of instantaneous frequency $f_1$, say, a relatively high frequency, is applied to the input terminals 216, 217, this wave will appear with relatively low amplitude in the output of sloping amplifier 219' and, thereby, across the vertical deflecting electrodes 203, 204 as indicated at $V_1$ in Fig. 21; the wave will also appear with relatively high amplitude in the output of sloping amplifier 219'' and, thereby, across the horizontal deflecting electrodes 201, 202, as indicated at $H_1$ in Fig. 21. Conditions will be reversed for a wave of relatively low frequency $f_2$ for which the horizontal and vertical deflections are shown as vectors $H_2$ and $V_2$, respectively. An intermediate frequency $f_3$ is represented by the vectors $H_3$ and $F_3$.

Any change in the mean or instantaneous amplitude of the input wave will proportionately increase or reduce the corresponding vertical and horizontal vectors, as indicated for the wave $f_2$ at $V_2'$ and $H_2'$. It will thus be apparent that the locus of the trace produced by the beam will be a straight line through the origin, the angle of inclination of this line being different for each frequency.

Fig. 9 shows a set of three electrodes 208*a* which may be used to distribute incoming signals over different channels, in the manner described in connection with Fig. 1. These electrodes, as is true of the electrodes shown in Figs. 10–12, extend within different sectoral areas of a circle, the lower limiting radius of each subsequent electrode having a greater angle of inclination than the higher limiting radius of the electrode immediately preceding. If, now, an amplitude modulated carrier is applied to terminals 216, 217 with the switch 212 closed, the frequency of the carrier will determine by which one, if any, of these electrodes the beam of the tube 200 is to be received. If the beam is thus caused to impinge upon the electrode 208', an amplitude modulated wave corresponding to that applied to the input terminals 216, 217 will be selectively received at the output terminals 214, 215 associated with this electrode.

If the electrodes 208*a* (Fig. 9) are replaced with the electrodes 208*b* (Fig. 10), an amplitude modulated output corresponding to the incoming wave may be obtained without intensity modulation (switch 212 left open). These electrodes have layers 225 of resistance material, preferably applied to some dielectric backing similar to member 124 of Fig. 5, and highly conductive collector strips 226, 227, as well as a highly conductive center piece 228. The center piece 228 of the several electrodes may or may not be connected together but should be insulated against ground. If each collector strip 226, 227 is grounded by way of a separate load resistor, such as resistors 113', 113'' (Figs. 4 and 6), the output voltage obtained will be proportional to the extent of the radial sweep of the beam across the face of the target electrode.

If the two collector strips of each target electrode are connected together, in a circuit as shown in Fig. 8, frequency doubling will result; this may be quite desirable where the high-frequency component of the output voltage is to be filtered out to produce the modulating signal.

Fig. 11 shows a modified target electrode 208*c* which may be used in lieu of any of the electrodes in Fig. 8 to produce a pulse width modulated pulsating output in response to a frequency modulated carrier wave of constant amplitude. For this purpose the electrode 208*c* is progressively foreshortened, i. e. its radial extent gradually decreases to zero upon passing from the lower limiting radius $R_L$ to the upper limiting radius $R_U$. This configuration is somewhat analogous to that of triangular electrode 108*a* (Fig. 2), in that for one limiting frequency the pulse width will be a maximum while for another limiting frequency the output will vanish.

Figure 12:
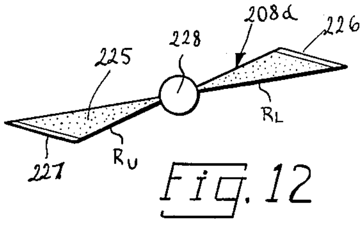

The electrode 208*d* of Fig. 12, which serves to convert a frequency modulated carrier into an amplitude modulated wave, is similar in its operation to electrodes 108*c* and 108*d* (Figs. 4–7) and is derived from electrode 208*b*, Fig. 10, by progressive radial foreshortening. It should be noted, however, that the radial extent of the electrode 208*d* at its shorter limiting radius $R_U$ is still far from zero, it being assumed (as in the case of electrode 108*c*) that the sweep of the beam is not greater than this shorter side of the electrode.

The center piece 228 is designed to insure an adequate conductive and mechanical connection between the two wings of each electrode 208*b* or 208*d*, and its radius should be sufficiently small to prevent any material distortion of the output wave.

Figures 13, 14, 15, 16, 17, 18, 19, 20:
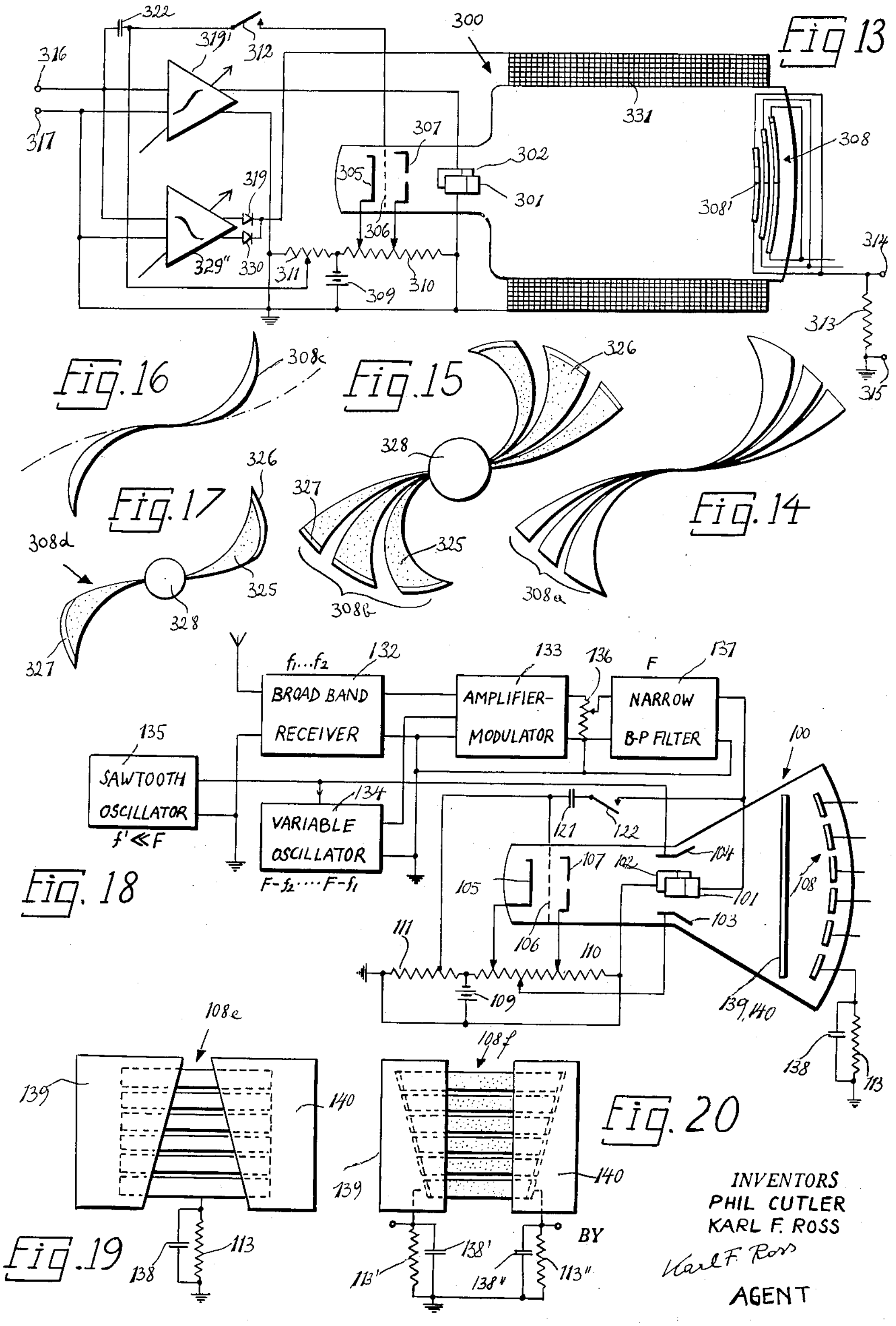
Fig. 13 is a circuit diagram illustrating a third embodiment of the invention.
Figs. 14 through 17 show various forms of output electrodes usable in the system of Fig. 13.
Fig. 18 is a circuit diagram illustrating the adaptation of the device shown in Fig. 1 to a system for the simultaneous reception of waves of different frequencies.
Figs. 19 and 20 show further forms of output electrodes usable in the systems of Figs. 1 and 18.

Fig. 13 shows a circuit arrangement similar to that of Fig. 8, including a cathode ray tube 300 having horizontal deflecting electrodes 301, 302, a cathode 305, a grid 306, an accelerating anode 307 and target electrodes 308, with electrode 308' connected to output terminal 314 which in turn is connected to grounded terminal 315 via a load resistor 313. Input terminals 316, 317 are connected in parallel to two oppositely sloping amplifiers 319', 319'', with the output of amplifier 319' connected across the horizontal deflection electrodes. Terminal 316 is connected via a condenser 322 and a switch 312 to grid 316. The cathode and anode potentials are derived from a battery 309 by means of a potentiometer 310 while the grid bias is taken from a potentiometer 311.

The amplifier 319'', having a balanced output, works by way of a frequency doubling network, shown as a pair of rectifiers 329, 330, into an electromagnetic coil 330 surrounding the tube 300. Coil 331 sets up an axial magnetic field in the cathode ray tube, in the space between the deflecting electrodes 303, 304 and the target electrodes 308.

Figure 22:
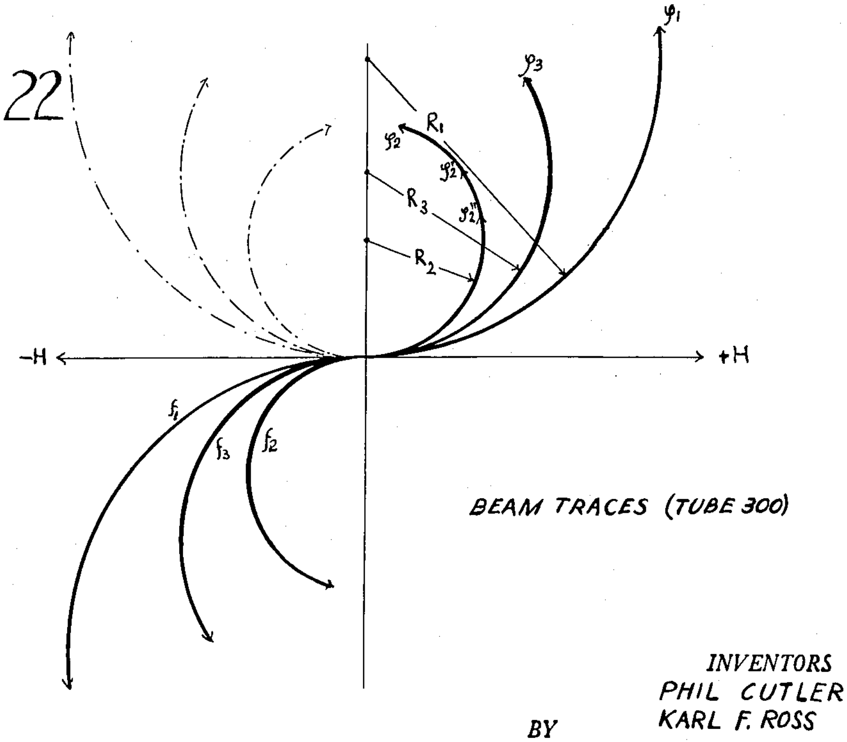
Fig. 22 is a graph to explain the operation of the system of Fig. 13.

Let us assume that the amplifier 319'' has an inductive amplitude-versus-frequency characteristic, that is to say, a wave of the form A cos $\omega t$ will appear in its output with an amplitude $$\frac{C_1}{\omega}\cos \omega t$$

further, that the amplifier 319' has a capacitive characteristic, the same wave appearing in the output of the latter with an amplitude $C_2\omega \cos \omega t$. $C_1$ and $C_2$ are constants. The output of amplifier 319' appears across the horizontal deflecting electrodes 301, 302, hence setting up an electrostatic field which results in a deflection of the beam at a speed $v$ proportional to this output. The beam, thus deflected, enters the zone of the magnetic field B which is proportional to the absolute magnitude of the output of amplifier 319' although its polarity, owing to the provision of rectifiers 329, 330, remains constant. It is known that an electron, having a speed component $v$ transverse to a magnetic field B, is deflected along the arc of a circle of a radius R proportional to $v$ and inversely proportional to B, or $R=kv/B$. Since B is proportional to $$\frac{\cos \omega t}{\omega}$$

and $v$ is proportional to $\omega \cos \omega t$, it follows that $R=C_3\omega^2$. In other words, the locus of the trace produced by the beam, for a wave of constant frequency applied to the input terminals 316, 317, will be an arc of a circle having a radius which is a function of the frequency, and this is illustrated in Fig. 22 for three frequencies $f_1$, $f_2$ and $f_3$ corresponding to radii $R_1$, $R_2$ and $R_3$, respectively. In this case, as before, $f_1$ represents a relatively high, $f_2$ a relatively low and $f_3$ an intermediate frequency.

Since the electrons when entering the magnetic field have already left the electrostatic field, their deflection speed $v$ becomes their constant tangential velocity until they hit the target plate. Their angular velocity $d\varphi/dt$ equals $v/R$ hence $$d\varphi/dt=\frac{C_1 \cos \omega t}{\omega}$$

Since it has been assumed that the transit time T of the electrons is short compared to the length of a cycle of the wave, we can regard this angular velocity as invariable during such transit time and can write for the ultimate angle of deflection the value $$T d\varphi/dt=\frac{C_5 \cos \omega t}{\omega}$$

this angle becomes a maximum $\varphi_{max}=C_5/\omega$ at the peaks of the oscillation, as indicated in Fig. 22 at $\varphi_1$, $\varphi_2$ and $\varphi_3$ for the frequencies $f_1$, $f_2$ and $f_3$, respectively, with intermediate values for the frequency $f_2$ shown at $\varphi_2'$ and $\varphi_2''$. The length of the trace, $s$, is then given with $s=R\varphi_{max}$, thus $s=C_6\omega$; it will thus be seen that the extent of the sweep increases with frequency, as will be apparent from Fig. 22 where like amplitudes have been assumed for all the three frequencies shown.

It will be noted that the curvature of the traces shown in Fig. 22 reverses at the origin; this is due to the provision of the rectifiers 329, 330 and enables better space utilization. The shape of the trace in the absence of frequency doubling is illustrated in dot-dash lines.

The principles explained in connection with the preceding figures may now be applied to the circuit of Fig. 13, a variety of electrodes suitable for this purpose being shown in Figs. 14 through 17. Electrodes 308*a*, Fig. 14, are similar to electrodes 208*a* (Fig. 9), except that the boundaries thereof are arcs of circles rather than straight lines; these electrodes may, therefore, be used to distribute amplitude modulated carriers over different loads, such as the resistor 313, or to effect the selective energization of several responsive devices, with the amplitude modulation applied, if desired, to the intensity control electrode 306 by way of the switch 312.

Electrodes 308*b*, Fig. 15, are similar in form to electrodes 308*a* but, like the electrodes 208*b* of Fig. 10 are provided with a resistive layer 325, collector strips 326, 327 and a conductive center piece 328. Whereas, however, the output of each electrode 208*b* may be frequency independent, since with proper design of amplifiers 219', 219'' the length of the sweep will be the same for each frequency (cf. Fig. 21), no attempt to accomplish such a result has been made in the case of electrodes 308*b* since, in view of the increase in sweep length with frequency, this would lead to rather inconvenient configurations. It will be understood, however, that the frequency dependence of each electrode 308*b* may be modified, e. g. minimized or increased, through the use of a layer 325 of varying thickness, as shown in Fig. 7 for the layer 125 of electrode 108*d*.

Electrode 308*c*, Fig. 16, is progressively foreshortened in the manner of electrode 208*c* and for the purpose described in connection with Fig. 11. A similar relationship obtains between the electrode 208*d* of Fig. 12 and the electrode 308*d* of Fig. 17, so that a more detailed description of the latter electrode becomes unnecessary.

While in the foregoing there have been disclosed several forms of a device for selectively channeling an incoming wave according to its frequency, we shall now describe an arrangement whereby a plurality of such waves may be received simultaneously and distributed to their proper channels with simultaneous frequency demodulation. Although it will be apparent that the system may be applied with minor modifications to any of the devices shown in the preceding figures, it will be specifically described in connection with a cathode ray tube distributor of the type shown in Fig. 1. Referring to Fig. 18, there is shown a broad-band receiver 132, designed to receive a frequency band ranging from a lower cut-off frequency $f_1$ to an upper cut-off frequency $f_2$, which works into an amplifier-modulator 133 to which a locally generated oscillation is applied by a variable oscillator 134 controlled, in turn, by a sawtooth oscillator 135. The output of amplifier-modulator 133 is fed, via a potentiometer 136, to a filter F having a narrow pass band centered on a key frequency F lying above the upper cut-off frequency $f_2$.

The sawtooth oscillator 135, whose operating frequency $f'$ is low in comparison with key frequency F but lies substantially above the highest modulating signal frequency, causes the output of oscillator 134 to vary, in the course of each sawtooth, from a lower limiting frequency $(F-f_2)$ to an upper limiting frequency $(F-f_1)$. The output of the sawtooth oscillator is also applied across the vertical deflecting electrodes 103, 104 of cathode ray tube 100 upon whose horizontal deflecting electrodes 101, 102 the output of filter 137 is impressed. A plurality of load resistors 113 (only one shown), each shunted by a condenser 138 to filter out the high-frequency component, is connected to a respective target electrode 108 which may have any of the forms shown in and discussed in connection with Figs. 2 through 7.

This system operates as follows:

Let us assume that within the pass band of receiver 132 there are several frequency modulated carrier waves $fa\pm\Delta f$, $fb\pm\Delta f$, $fc\pm\Delta f$ etc. Whenever the frequency of oscillator 134 is approximately equal to $F-fa$, which occurs once per cycle of sawtooth generator 135, the modulator 133 will produce the key frequency F which passes through the filter 137 and reaches the horizontal deflecting electrodes 101, 102 as well as, if desired, the grid 106. This will cause the beam of tube 100 to oscillate across the face of one of the electrodes 108, as determined by the instantaneous vertical deflecting potential applied to the electrodes 103, 104 by the sawtooth oscillator 135. The cut-off of filter 137 should be sharp enough to produce a sweep of the beam only across a narrow horizontal strip of the particular target electrode which strip, in turn, will be higher up or farther down on the face of this target electrode according to how far and in what sense the instantaneous frequency of the modulated wave deviates from the carrier frequency $fa$. The process will be similar when the frequency of oscillator 134 reaches the value $F-fb$, except that now the beam will impinge upon a different target electrode. Thus the system will sample, $f'$ times per second, the instantaneous frequency of each carrier wave to which it is adjusted; for each such carrier wave there will accordingly be produced a train of pulses, varying in amplitude and/or width with the modulating signal, which will be integrated in a respective load circuit such as resistor 113 and condenser 138. These signals, properly channelized, may then be taken off at the various output terminals respectively associated with the target electrodes 108.

Figs. 19 and 20 show two further arrangements suitable for converting the horizontal sweep of a beam into a train of pulses varying in width or amplitude with the level of the sweep. In Fig. 19 a set of electrodes 108*e*, in the form of vertically spaced rectangular strips of highly conductive material, are partially shielded by a pair of screens 139, 140 having converging edges so as to form a trapezoidal slot between them, thereby exposing progressively shorter portions of these electrodes (passing from the lowest to the highest) to the impinging beam. It will be apparent that this produces pulses of varying width, similar to those produced by a set of electrodes 108*b* as shown in Fig. 3, except that in Fig. 19 the decrease in pulse width will continue from one channel to the other. The length and configuration of the electrode portions covered by the screens 139, 140 is, of course, quite immaterial. In Fig. 20 a set of trapezoidal electrodes 108*f*, each similar to or identical with electrode 108*c* of Figs. 4 and 5, have their ends hidden behind the screens 139, 140 which, however, in this case form a rectangular slot between them. The screens, accordingly, act in this case as amplitude limiters, so that the actual sweep of the beam may be far greater than set forth in connection with Fig. 4. The resulting pulses of constant width but varying amplitude are then integrated in the load resistors 113′, 113″ shunted by respective high-frequency bypass condensers 138′, 138″. The position of the screens 139, 140 between the target electrodes 108 and the deflecting electrodes of the tube 100 has been illustrated in Fig. 18.

It is to be understood that the invention may be embodied in many forms other than those specifically described and illustrated without, for this reason, exceeding its scope as defined in the annexed claims. It should also be remembered that the terms "horizontal" and "vertical," as used in the foregoing specification and in certain claims, are to be construed in a relative sense only since, obviously, the absolute orientation of the system in space may be selected quite arbitrarily without affecting its mode of operation in any material way.

What we claim as novel, and desire to secure by Letters Patent, is:

1. A distributor for channeling waves of different frequencies, comprising a cathode ray tube, signal input means for said tube, a plurality of target electrodes in the path of the beam of said tube, deflecting means for changing the direction of said beam, deflection control means progressively aligning said beam in periodically repeated sweeps with different ones of said target electrodes by controlling said deflecting means, scanning means connected to said signal input means and testing a range of signal frequencies in step with said periodically repeated sweeps under control of said deflection control means, a plurality of output means connected to respective ones of said target electrodes for selective energization by said beam, and trigger means controlled by said scanning means to become operative to change the character of said beam upon said scanning means encountering a signal wave in testing said range, said trigger means thereby imparting a characteristic signal to the output means connected to any target electrode then aligned with said beam.

2. A distributor for channeling and demodulating frequency modulated carrier waves of different frequencies, comprising a cathode ray tube, signal input means for said tube adapted to receive the said carrier waves, a plurality of target electrodes in the path of the beam of said tube, deflecting means for changing the direction of said beam, sweep means for causing said beam to produce a trace across the face of any of said target electrodes in alignment therewith, deflection control means progressively displacing the locus of said trace across all of said target electrodes successively, in a series of periodically recurring cycles, by controlling said deflecting means, scanning means connected to said signal input means and testing a range of signal frequencies in step with said progressive displacement during each of said cycles under control of said deflection control means, trigger means normally maintaining said sweep means inactive and actuating said sweep means under control of said scanning means upon the latter encountering any of said carrier waves in testing said range, thereby causing said beam to oscillate across a target electrode then aligned therewith, and a plurality of output means connected to respective ones of said target electrodes for converting beam energy impinging upon said target electrode into output energy modulated by the oscillations of said beam, said target electrodes having different zones positioned to be successively swept by said beam, said zones being different in their degree of receptiveness to the oscillations of said beam.

3. A distributor for signals of different frequencies, comprising a cathode ray tube, first and second deflecting means adapted to deflect the beam of said tube in different directions, signal input means, a first and a second alternating-current transmission path connecting said first and second deflecting means, respectively, to said signal input means, said first and second transmission paths having different impedance-versus-frequency but similar phase-versus-frequency characteristics whereby input signals of different frequencies will cause said beam to describe different traces at a location beyond said deflecting means, said traces meeting at a common origin, and target means positioned beyond said deflecting means to be impinged upon by said beam, said target means having zones of different degree of receptiveness to said beam in alignment with the loci of respective ones of said traces.

4. A distributor according to claim 3, wherein said target means comprises a single electrode whose periphery has a distance from said common origin which, when measured along said different traces, is different for each of said traces.

5. A distributor according to claim 4, wherein said electrode comprises a body of resistance material and an output connection at said periphery.

6. A distributor according to claim 3, including intensity control means for said beam connected to said signal input means, said target means comprising a plurality of elongated electrodes, of substantially uniform conductivity, each provided with individual output means and registering with a respective one of said traces.

7. A distributor according to claim 3, wherein said target means comprises a plurality of elongated electrodes of resistance material each aligned with a respective one of said traces and provided with output connections on its extremities.

8. A frequency selector comprising a cathode ray tube, target means in said tube, means for directing a beam of electrons toward said target means, deflecting means adapted to impart to said electrons a velocity component transverse to the principal direction of said beam, electromagnetic coil means adapted to produce a magnetic field extending along said principal direction, a source of alternating-current input signals of different frequencies, a first alternating-current transmission path connecting said source to said deflecting means, a second alternating-current transmission path connecting said source to said coil means, said paths having different impedance-versus-frequency characteristics whereby input signals of different frequencies will cause said beam to describe different traces at the location of said target means, said target means having at least one zone shaped in substantial conformity with one of said traces and provided with output means for producing a characteristic signal in response to the corresponding input signal frequency.

9. A frequency selector according to claim 8, wherein said target means comprises at least one elongated electrode curved substantially along an arc of a circle.

10. A frequency selector according to claim 8, wherein said target means comprises at least one elongated, curved electrode bounded by arcs of two tangent circles of different radii.

11. A frequency selector according to claim 8, wherein said target means comprises at least one elongated electrode having inversely curved halves, said second transmission path including frequency-doubling rectifier means.

12. A frequency selector according to claim 8, wherein said deflecting means is positioned ahead of the magnetic field produced by said coil means.

References Cited in the file of this patent

UNITED STATES PATENTS

| | | |
|---|---|---|
| 1,854,247 | Brand et al. | Apr. 19, 1932 |
| 2,097,392 | Finch | Oct. 26, 1937 |
| 2,224,677 | Hanscom | Dec. 10, 1940 |
| 2,236,134 | Gloess | Mar. 25, 1941 |
| 2,256,336 | Beatty | Sept. 16, 1941 |
| 2,324,851 | Koch | July 20, 1943 |
| 2,408,702 | Sziklai | Oct. 1, 1946 |
| 2,431,396 | Hansell | Nov. 25, 1947 |
| 2,438,709 | Labin et al. | Mar. 30, 1948 |
| 2,470,731 | Sziklai | May 17, 1949 |
| 2,533,405 | Skellett | Dec. 12, 1950 |
| 2,560,166 | Glenn | July 10, 1951 |
| 2,560,585 | McMillan | July 17, 1951 |